Oct. 31, 1961     B. A. BLEWIS ET AL     3,006,787
METHOD OF IMPROVING PROPERTIES OF FLAME RESISTANT
POLYETHYLENE AND PRODUCTS THEREOF
Filed Sept. 12, 1958

Fig. 1

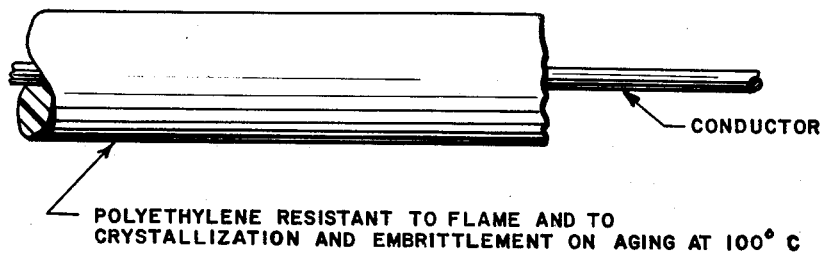

— CONDUCTOR

— POLYETHYLENE RESISTANT TO FLAME AND TO
CRYSTALLIZATION AND EMBRITTLEMENT ON AGING AT 100° C

Fig. 2

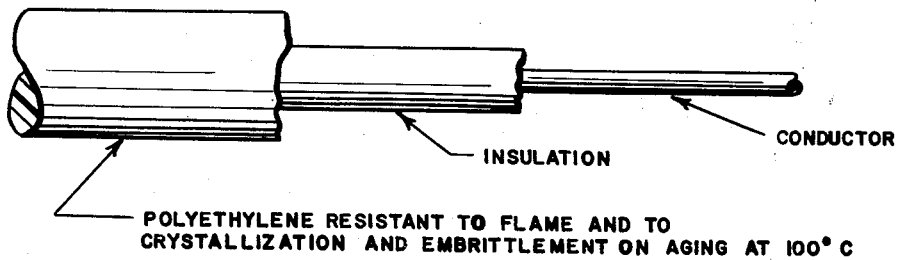

— CONDUCTOR
— INSULATION

— POLYETHYLENE RESISTANT TO FLAME AND TO
CRYSTALLIZATION AND EMBRITTLEMENT ON AGING AT 100° C

INVENTORS
Bernard A. Blewis
Albert H. Steinberg
BY

Emery, Whittemore, Sandoe & Dix
ATTORNEYS ial 3,006,787
Patented Oct. 31, 1961

3,006,787
METHOD OF IMPROVING PROPERTIES OF FLAME RESISTANT POLYETHYLENE AND PRODUCTS THEREOF
Bernard A. Blewis, New York, N.Y., and Albert H. Steinberg, Newark, Ohio, assignors to General Cable Corporation, New York, N.Y., a corporation of New Jersey
Filed Sept. 12, 1958, Ser. No. 760,592
9 Claims. (Cl. 117—232)

This invention relates to a method of improving the properties of flame resistant polyethylene, or stated in another way, to the method of imparting flame resistance to polyethylene without materially impairing its electrical and mechanical properties, and also to the improved flame resistant compositions produced by the method, and to electrical conductors insulated and sheathed with such flame resistant compositions.

It is an object of the invention to improve the properties of flame resistant polyethylene. It is an object of the invention to impart a high degree of flame resistance to polyethylene while preserving the electrical and mechanical properties of the polyethylene substantially unimpaired. It is an object of the invention to provide flame resistant polyethylene compositions which have little or no more tendency to crystallize and become brittle on aging than did the polyethylene prior to incorporation of the flame resistant ingredients. It is an object of the invention to provide flame resistant polyethylene compositions in which incorporation of the flame resistant ingredients does not depress the viscosity to adversely affect the resistance of the compositions to deformation under load at elevated temperatures. It also is an object of the invention to provide improved electrical insulation and improved insulated and sheathed conductors. Other objects and advantages of the invention will become evident or will be pointed out as the description proceeds.

Embodiments of the invention selected solely for purposes of illustration and description are shown in the accompanying drawings, in which:

FIGURE 1 discloses an electrical conductor insulated with an improved flame resistant composition of the present invention; and FIGURE 2 discloses an electrical conductor insulated with rubber or other insulation and provided with an enclosing jacket or sheath of an improved flame resistant composition of the present invention.

The favorable electrical and physical properties of the solid polymers of ethylene known as polyethylene or polythene have led to extensive use of these materials for insulating electrical conductors, and also for jacketing or sheathing conductors which are insulated with other materials. These polymers are tough solids at normal temperatures, with a melting point of about 212° to 270° F. Although these polymers have many desirable properties which make them attractive for use in the manufacture of electrical wires and cables, they are highly inflammable and this fact has imposed some limitations on their use on wires and cables.

It has been proposed heretofore to improve the resistance of polyethylene to flame by incorporating various materials in the polyethylene. Flame resistance has been obtained by combining with polyethylene a solid chlorinated hydrocarbon of high chlorine content, such as chlorinated paraffin, and an inorganic flame retardant substance such as antimony trioxide, in critical proportions to each other and to the polyethylene. Such compositions are described in the Happoldt, Jr., Patent No. 2,480,298, issued to E. I. du Pont de Nemours & Company on August 30, 1949. Other flame resistant compositions are disclosed in the Rugar Patent No. 2,590,211, March 25, 1952, and in the Bierly Patent No. 2,669,521, February 16, 1954, both issued to Diamond Alkali Company.

The resulting compositions may be acceptable from the standpoint of flame resistance, but other desirable properties of the polyethylene are substantially impaired by the inclusion of the flame retardant materials. These flame resistant polyethylenes are subject to excessive crystallization and embrittlement, particularly after natural or accelerated aging. This is indicated by the very high falloff in ultimate elongation of these materials after mild aging in an air oven for as short a time as two days at 100° C. In addition, the high amount of chlorinated paraffin or other organic chlorinated material which is necessary to produce a good degree of flame resistance acts as a viscosity depressant and adversely affects the resistance of the polyethylene composition to deformation under load at elevated temperatures. The organic flame retardant material most frequently used both reduces the viscosity of the composition and increases its tendency to crystallize.

It has been proposed also to incorporate additional non-chlorinated elastomers, sometimes with reduced proportions of the flame retardant materials, in such flame resistant polyethylene compositions in an effort to improve these undesirable aging characteristics. Such elastomer materials, of which butyl rubber and polyisobutylene are examples, are themselves flammable and, of course, the flame resistance of the composition is undesirably affected by their inclusion. Addition of the non-chlorinated elastomers may be effective in retarding increased crystallization resulting from natural or accelerated aging, but it does not permit any material reduction in the amount of chlorinated paraffin which is necessary if a satisfactory level of flame resistance is to be obtained. Moreover, such compositions show considerably greater deformation under load at elevated temperatures than do the compositions of the present invention. Butyl rubber and polyisobutylene have a very great tendency to flow, and the amount which can be added without materially impairing the flow properties of the flame proof polyethylene at elevated temperatures is restricted to a maximum level of approximately 6 parts by weight of butyl rubber or polyisobutylene on 100 parts of polyethylene. Such compositions show a considerably greater tendency to crystallize than do compositions made according to the present invention.

Applicants have found that a flame resistant polyethylene composition which contains a highly branched chlorine-containing elastomer, such as neoprene, an appropriately reduced amount of chlorinated paraffin, an inorganic flame retardant such as antimony trioxide, and appropriate organic stabilizers for the polyethylene, the neoprene, and the chlorinated paraffin, is vastly improved in its resistance to crystallization as a result of natural or accelerated aging, and in its resistance to deformation under load at elevated temperatures. These desirable properties are attained without impairment of the flame resistance of the composition.

A typical flame resistance polyethylene composition according to the present invention is as follows:

| | Parts by weight |
|---|---|
| High molecular weight polyethylene | 90 |
| Chlorowax 70 | 20 |
| Antimony trioxide | 29 |
| Neoprene W | 10 |
| Neozone A | .2 |
| Union Carbide Stabilizer A-5 | .9 |

The Chlorowax 70 is a chlorinated paraffin containing 70% of combined chlorine, which gives the preferred chlorine content to the compositions described. If chlorinated paraffins or hydrocarbons containing lesser amounts of combined chlorine are used there will be a proportionate diminution in flame resistance. All formulas in this application are based on chlorinated paraffin of similar chlorine content. Neoprene W is a general purpose type of polychloroprene synthetic rubber manufactured by du Pont. Neozone A is an organic antioxidant added to stabilize the neoprene. The Union Carbide stabilizer A–5 or equivalent material is used to insure stability of the chlorinated paraffin.

This composition has been found to possess excellent electrical stability both under wet and dry operating conditions and is similar to polyethylene in this respect. The mechanical properties of this composition are similar to those of polyethylene and the composition can be used as an extrudable insulating composition, or as a cable sheath. In the latter event an appropriate amount of fine channel black, such as Kosmos BB, desirably is added to provide weathering resistance. Because of the reduction in the amount of chlorinated paraffin as compared to the known flame resistant polyethylenes, better low temperature properties are obtained.

The proportions of the ingredients may be varied considerably and the advantages of the present invention still obtained. Such variations may be within the following ranges:

| | Parts by weight |
|---|---|
| Polyethylene | 100 |
| Neoprene | 2 to 20 |
| Antimony trioxide | 18 to 47 |
| Chlorinated paraffin with appropriate stabilizer | 10 to 30 |

The foregoing proportions of ingredients apply for all grades of low and high density polyethylene used in the electric wire and cable industry. Inclusion of the neoprene permits lowering of the amount of chlorinated paraffin without substantial impairment of the flame resistance. For example, substitution of ten parts of neoprene for ten parts of chlorinated paraffin in the flame resistant compositions of the prior art produces no significant change in the flame resistance, and if accompanied by the substitution of a high molecular weight polyethylene for medium molecular weight polyethylene there will be no material impairment of other properties.

The flame resistant polyethylene compositions of the present invention have the following advantages over previously known flame resistant polyethylene compositions:

(1) Greater flexibility before and after natural and accelerated aging, as indicated by the high initial elongation at break of over 500% which is virtually unaffected by accelerated aging such as air oven treatment for seven days at 100° C.

(2) Ability to resist the Bell Telephone Laboratories environmental cracking test at temperatures ranging from 50° to 90° C. before and after natural and accelerated aging.

(3) Improved resistance to abrasion as indicated by an abrasion test under load using a coarse rat tail file.

(4) Equivalent or better flame resistance as indicated by ability to pass the Underwriters' Laboratories Vertical Flame Test when extruded on a copper conductor.

(5) Better resistance to compression flow at elevated temperatures.

(6) Better low temperature properties for any given degree of flame resistant properties as indicated by the ASTMD–746 Brittleness Test.

The flame resistant polyethylene compositions herein described may be extruded or otherwise applied to electric conductors and over insulated conductors in known manner. FIGURE 1 of the application drawings shows a conductor insulated with a polyethylene composition of the present invention which is resistant to flame and to crystallization and embrittlement. FIGURE 2 shows an insulated conductor having a surrounding jacket comprising an improved composition of the present invention. The insulation may be rubber or any other suitable material.

The term "neoprene" is used herein as the generic name for chloroprene rubber made by the polymerization of 2-chloro-1,3 butadiene.

The invention herein disclosed may be variously modified and embodied within the scope of the subjoined claims.

We claim:

1. The method of maintaining substantially unimpaired the resistance to crystallization and embrittlement as a result of aging, and the resistance to deformation under load at elevated temperatures, without substantial impairment of the flame resistance, of polyethylene to which 18 to 47 parts by weight of antimony trioxide and 10 to 30 parts by weight of chlorinated paraffin containing 70% of combined chlorine to 100 parts by weight of polyethylene have been added for the purpose of imparting flame resistance, which comprises including 2 to 20 parts by weight of neoprene in the mixture.

2. The method of improving the flame resistance of polyethylene compositions by incorporating in the polyethylene an inorganic flame retardant such as antimony trioxide and an organic flame retardant such as chlorinated paraffin, and preventing substantial impairment of other properties of the polyethylene resulting from inclusion of these flame retardants by incorporating therein 2 to 20 parts by weight of a chlorinated elastomer per 100 parts by weight of polyethylene.

3. The method of improving the resistance of polyethylene to flame, while preserving the electrical and other properties of the polyethylene substantially unimpaired, which comprises compounding neoprene, antimony trioxide and chlorinated paraffin with the polyethylene in approximately the following proportions by weight:

| | Parts |
|---|---|
| Polyethylene | 100 |
| Neoprene | 2–20 |
| Antimony trioxide | 18–47 |
| Chlorinated paraffin (70% combined chlorine) | 10–30 |

4. The method of improving the resistance of polyethylene to flame, while preserving the electrical and other properties of the polyethylene substantially unimpaired, which comprises compounding neoprene, antimony trioxide and chlorinated paraffin with the polyethylene in approximately the following proportions by weight:

| | Parts |
|---|---|
| Polyethylene | 90 |
| Neoprene | 10 |
| Antimony trioxide | 29 |
| Chlorinated paraffin (70% combined chlorine) | 20 |

5. An extrudable insulating composition comprising the following constituents in the proportions by weight as set forth:

| | Parts |
|---|---|
| Polyethylene | 100 |
| Neoprene | 2–20 |
| Antimony trioxide | 18–47 |
| Chlorinated paraffin (70% combined chlorine) | 10–30 | said composition being resistant to flame and aging and having substantially the electrical and other properties of polyethylene.

6. An extrudable insulating composition comprising the following constituents in approximately the proportions by weight as set forth:

| | Parts |
|---|---|
| Polyethylene | 90 |
| Neoprene | 10 |
| Antimony trioxide | 29 |
| Chlorinated paraffin (70% combined chlorine) | 20 | said composition being resistant to flame and aging and having substantially the electrical and other properties of polyethylene.

7. An electrical conductor provided with a covering of stable insulating composition resistant to flame and aging and comprising the following constituents in approximately the following proportions by weight:

|  | Parts |
|---|---|
| Polyethylene | 100 |
| Neoprene | 2–20 |
| Antimony trioxide | 18–47 |
| Chlorinated paraffin (70% combined chlorine) | 10–30 | the composition having substantially the electrical and other properties of polyethylene.

8. An electrical conductor provided with a covering of stable insulating composition resistant to flame and aging and comprising the following constituents in approximately the following proportions by weight:

|  | Parts |
|---|---|
| Polyethylene | 90 |
| Neoprene | 10 |
| Antimony trioxide | 29 |
| Chlorinated paraffin (70% combined chlorine) | 20 | the composition having substantially the electrical and other properties of polyethylene.

9. The method improving the flame resistance of a polyethylene enclosed electric conductor without substantially impairing other properties of the polyethylene which comprises including in the polyethylene 18 to 47 parts by weight of antimony trioxide, 10 to 30 parts by weight of chlorinated paraffin (70% combined chlorine) and 2 to 20 parts by weight of neoprene, to 100 parts by weight of polyethylene.

References Cited in the file of this patent

UNITED STATES PATENTS 2,830,919    Schatzel _____ Apr. 15, 1958

FOREIGN PATENTS 539,206    Italy _____ Feb. 8, 1956